Oct. 6, 1959      C. W. LAMBTON      2,907,528
MIXING DEVICE FOR DELIVERING LIQUID MIXTURES OR SOLUTIONS
Filed March 18, 1957
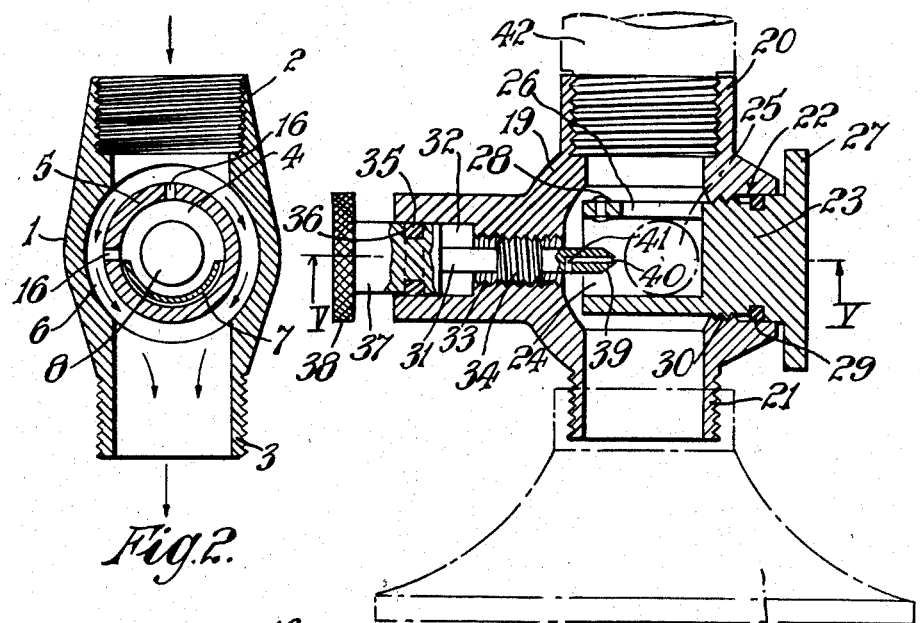
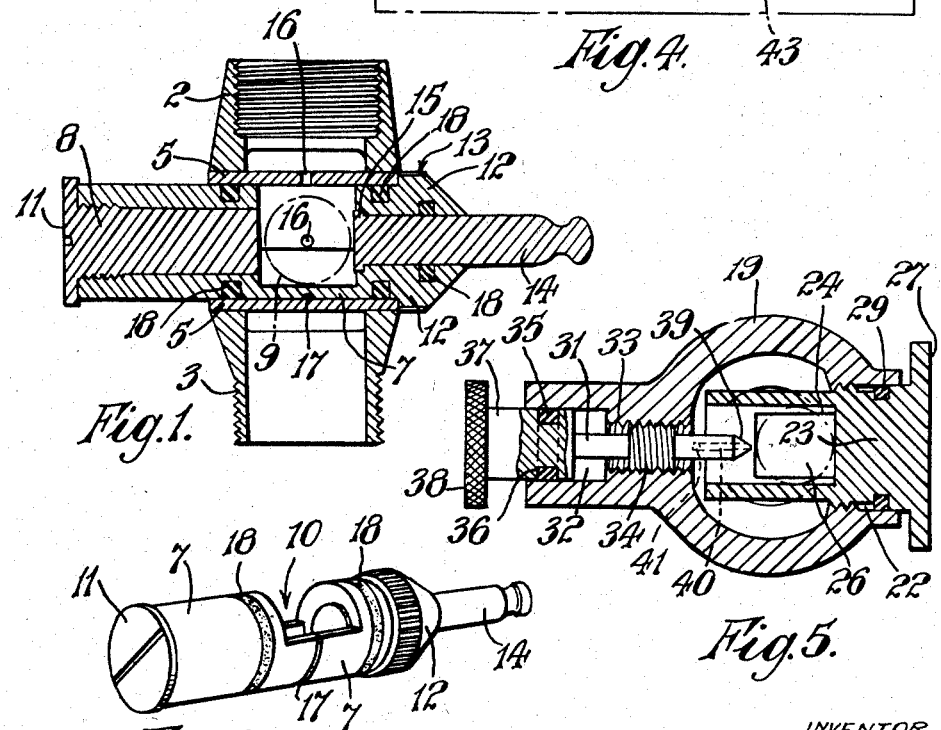
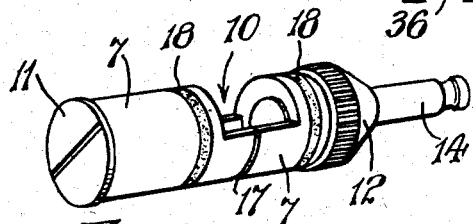
INVENTOR
Charles William Lambton
by Michael S. Striker
agt.

United States Patent Office 2,907,528
Patented Oct. 6, 1959

2,907,528

MIXING DEVICE FOR DELIVERING LIQUID MIXTURES OR SOLUTIONS

Charles William Lambton, Mortimer Hill, Mortimer, England

Application March 18, 1957, Serial No. 646,854

Claims priority, application Great Britain December 5, 1956

13 Claims. (Cl. 239—315)

This invention has for its object to provide a mixing device of simple construction, adapted to be fitted into a water or other liquid supply, which can be used to introduce into such supply a quantity of perfume, soap, detergent, deodorant, antiseptic or other chemical substance as desired by the user so as to form a solution thereof in the water supply, but which at the same time does not interfere with the normal supply of the water when the mixture is not required.

To this end the present invention consists broadly in a mixing device for delivering liquid mixtures or solutions comprising a housing having inlet and outlet openings for the water and means engageable with a closed container within said housing and filled with the substance to be mixed with the water, to open the container and permit discharge of the contents of said container into the housing.

The container for use with the mixing device of the present invention is made of a substantially water insoluble material and preferably one which can be opened simply by applying pressure thereto to effect rupture of the container wall, or alternatively which can easily be pierced simply by pressing piercing means against the container wall. The container may therefore advantageously be made of a synthetic plastic material or alginate material and may be spherical or of any other desired shape.

Accordingly the mixing device may for example, consist of a housing having inlet and outlet openings for the water and means for holding a closed container filled with the substance to be mixed with the water, said holding means locating the closed container within the housing in relation to rupturing means movable relative thereto to effect rupturing of the container to permit the discharge of the container contents into the housing.

When opening of the container is to be effected by piercing the mixing device may consist for example of a housing having inlet and outlet openings for the water and means within said housing for holding a container filled with the substance to be mixed with the water, said holding means locating the container in relation to piercing means movable relative thereto to effect piercing of the container to permit the discharge of the contents of the container into the housing.

The discharge of the contents of the closed container is for preference effected or assisted by suction created by the flow of water through the housing. This can be obtained by the provision of a suitable outlet orifice or orifices through which the container contents discharge into the housing the orifice or orifices being disposed in a manner such that the container contents are drawn through the same by the suction effect of the flow of water past the orifice or orifices. By varying the position of the orifice or orifices in relation to the direction of flow of the water the rate of discharge of the container contents can be controlled.

In order that the invention may clearly be understood and carried into effect the same will now be described by aid of the accompanying drawings in which:

Figure 1 is a longitudinal central section through a mixing device having rupturing means for opening the closed container, Figure 2 is a transverse section of the device shown in Figure 1, and Figure 3 is a perspective view of the closed container holding means and rupturing means of Figures 1 and 2.

Figure 4 is a longitudinal central section through a mixing device having piercing means for opening the closed container and Figure 5 is a section on the line V—V of Figure 4.

According to the construction shown in Figures 1 to 3 the mixing device comprises a housing made as a metal casting, the housing having a spherical portion 1 and tubular extensions 2 and 3 disposed co-axially with one another at diametrically opposite points of the spherical portion, said tubular extensions forming respectively inlet and outlet openings for the water and being either threaded as shown or provided with coupling means for connection of the device in a water supply system.

The spherical portion 1 of the housing is provided with a cylindrical bore 4 formed by a cylindrical wall 5 extending therethrough, the longitudinal axis of the bore being disposed at right angles to the axis through the tubular extensions forming the inlet and outer openings 2, 3. The annular space 6 between the outer surface of the cylindrical wall 5 and the inner surface of the cylindrical portion 1 of the housing provides a passage for the flow of water between the inlet and outlet openings.

Mounted in the bore 4 formed by the cylindrical wall 5 is a sleeve 7 one end of which is closed by a cylindrical plug 8. The sleeve forms holding means for the closed container, shown diagrammatically at 9, filled with the substance to be mixed with the water and is slidable in the bore to permit withdrawal of the same from the bore to a position in which a gap 10 in the wall of the sleeve 7 is exposed and through which a container can be inserted in the sleeve, the plug portion being located in the bore when the sleeve is in the withdrawn position. The sleeve is then moved inwardly into the bore to the position shown in Figure 1 after insertion of the container, to position the same in the interior of the housing.

The operation of the sleeve is facilitated by providing at the opposite ends of the same a knob or enlarged head which can be grasped by the user, such knob or enlarged head providing stop means for limiting the opposite axial sliding movements of the sleeve. At one end of the sleeve the enlarged head 11 is provided on the plug 8 and at the opposite end by the enlarged head 12 which is formed integral with the sleeve the head 12 having a serrated peripheral rim 13.

The rupturing means is in the form of a rod 14 which is slidably mounted in a bore extending through the end 12 of the sleeve 7. The inner end of the rod is provided with a head 15 and is movable from the retracted position shown in Figure 1 in which the headed end is out of contact with a container located in the sleeve towards the container, the continued movement of the rod 14 in this direction causing pressure to be applied to the container wall to rupture the same so that the container contents fill into the sleeve.

Discharge of the substance from the sleeve 7 into the housing to obtain mixing is obtained by providing the cylindrical wall 5 of the housing, with radial drillings 16 which are disposed at 90° from one another, the flow of the substance being assisted by the suction created by the passage of the water through the housing.

With the radial drillings 16 arranged as shown a rapid mixing is obtained. The drilling 16 facing the inlet opening is located at the point of minimum velocity of the water and therefore maximum pressure and the other where the reverse conditions exist so that a pressure difference is established which results in flow of water into and out of the sleeve the flow also being assisted by the suction created by such flow. Thus by varying the angular position of the radial drillings 16 in relation to the direction of flow of the water the degree of mixing can be varied. It is therefore possible to contruct the device so that the cylindrical wall member 5 is rotatable, such rotation permitting the variation of the position of the drillings 16.

The external periphery of the sleeve 7 has an annular groove 17 which ensures delivery into the housing of any liquid collecting between the sleeve 7 and bore 4. Axial leakage along the sleeve 7 and rod 14 is prevented by the provision of sealing members 18.

The sleeve when in the withdrawn position effectively seals the drillings 16 in the cylindrical wall 5 so that water flowing through the housing cannot discharge through these drillings when the sleeve is withdrawn. To eject a used container from the sleeve 7 the sleeve can be rotated so that the container falls out through the aperture 10.

In the construction of device shown in Figures 4 and 5 opening of the container is obtained by piercing the wall of the container by piercing means.

According to this embodiment of the invention the mixing device comprises a housing made as a metal casting, the housing having a spherical portion 19 and tubular extensions 20 and 21 disposed co-axially with one another at diametrically opposite points of the spherical portion, said tubular extensions forming respectively inlet and outlet openings for the water and being threaded as shown.

Intermediate the length of the housing, the wall thereof is provided with an aperture 22 through which a sleeve 23 extends, the sleeve being arranged with its longitudinal axis disposed at right angles to the axis of the housing inlet and outlet openings. The bore 24 of the sleeve projecting into the housing provides holding means for the container shown diagrammatically at 25 and the sleeve is mounted so as to be slidable in the wall aperture to permit withdrawal of the same to a position in which an aperture 26 in the wall of the sleeve is exposed and through which a container can be inserted in the sleeve bore. The sleeve is then moved inwardly, after insertion of the container, to position the same in the interior of the housing as shown in Figure 4. The op-operation of the sleeve is facilitated by providing the outer end of the same with a knob or enlarged head 27 which can be grasped by the user. A rivet 28 at the inner end of the sleeve provides stop means for limiting the outward movement of the sleeve and a sealing ring 29 adjacent the outer end of the sleeve prevents leakage between the sleeve 23 and the aperture 26 in the housing wall. Both the sleeve and aperture are provided with rapid threads 30 for securing the sleeve in the inner position.

The piercing means is in the form of a rod 31 which is located in a bore 32 extending through the wall of the housing, opposite to the sleeve-mounting aperture 22, the rod 31 being mounted so as to be axially displaceable about an axis, parallel to the axis of the sleeve. For this purpose the bore 32 is provided for a portion of its length with a thread 33 which engages a correspondingly threaded portion 34 on the rod 31 so that by rotating the rod the same is moved axially into or out of the housing according to the direction of rotation. Axial leakage along the rod is prevented by a sealing member 35 accommodated in a groove 36 provided in the rod portion 37 of enlarged diameter the outer end of which is provided with a knob 38 to facilitate operation of the rod.

The inner end 39 of the rod 31 is pointed and the same is provided with a passage 40 which extends in the longitudinal direction of the rod from the pointed end, the passage communicating with an outlet branch 41 provided by a radially disposed drilling in the rod.

The rod 31 is movable from the retracted position shown in which the pointed end is out of contact with a container 25 located in the sleeve bore 24 towards the container the amount of travel being sufficient to permit the pointed end of the rod to pierce the container wall and enter the same whereby the contents of the container can be discharged by the suction effect created by water passing through the housing.

Due to the nature of the material from which the container is made a sealed joint is provided automatically between the edge of the hole punctured in the container wall and the peripheral surface of the piercing member. The rate of discharge of the contents of the container can be controlled by suitable dimensioning of the bores of the passage and outlet branches. It is also possible to interrupt mixing if the movement of the piercing member is sufficient to permit displacement of the same to a position in which the outlet branch is located within the container.

The device of the present invention is particularly suitable for toilet purposes and is advantageously used in conjunction with a nozzle or nozzles so that the solution or mixture is delivered in the form of spray. For example the inlet opening of the housing can be fitted to the water supply conduit 42 shown chain dotted in Figure 4 of a bath shower, the spray nozzle 43, also shown chain dotted in Figure 4, of the shower being fitted to the outlet opening of the housing, and similarly the device can be adapted for use with a hand spraying unit.

I claim:

1. A mixing device for forming liquid mixtures or solutions and comprising, in combination, housing means having an inlet and an outlet for water flowing through the interior of said housing means; holding means movably disposed within said interior and providing a fluid passage therearound, said holding means having a chamber adapted to hold a closed container filled with a substance to be mixed with water, said holding means having a portion located outside of said housing means for manual operation and being mounted on said housing means movable between a loading position in which said chamber is located outside of said housing means for insertion of a container and an operative position in which said chamber is located in said housing means, said holding means being fluid-tight mounted in said housng means in both said loading position and said operative position so that flowing water in said fluid passage is retained in said housing means in both positions; and manually operated container engaging means mounted on one of said means for movement toward and away from said chamber to effect opening of a container in said chamber in said operative position to permit discharge of said substance into the water flowing through the interior of said housing means.

2. A mixing device for forming liquid mixtures or solutions and comprising, in combination, housing means having an inlet and an outlet for water flowing through the interior of said housing means; holding means movably disposed within said interior and providing a fluid passage therearound, said holding means having a chamber adapted to hold a closed container filled with a substance to be mixed with water, said holding means having a portion located outside of said housing means for manual operation and being mounted on said housing means movable between a loading position in which said chamber is located outside of said housing means for insertion of a container and an operative position in which said chamber is located in said housing means, said holding means being fluid-tight mounted in said housing means in both said loading position and said operative position so that flowing water in said fluid passage is retained in said housing means in both positions; and manually operated container engaging means mounted on said holding means for movement toward and away from said chamber to effect opening of a container in said chamber in said operative position to permit discharge of said substance into the water flowing through the interior of said housing means.

3. A mixing device for forming liquid mixtures or solutions and comprising, in combination, housing means having an inlet and an outlet for water flowing through the interior of said housing means; holding means movably disposed within said interior and providing a fluid passage therearound, said holding means having a chamber adapted to hold a closed container filled with a substance to be mixed with water, said holding means having a portion located outside of said housing means for manual operation and being mounted on said housing means movable between a loading position in which said chamber is located outside of said housing means for insertion of a container and an operative position in which said chamber is located in said housing means, said holding means being fluid-tight mounted in said housing means in both said loading position and said operative position so that flowing water in said fluid passage is retained in said housing means in both positions; and manually operated container engaging means mounted on said housing means for movement toward and away from said chamber to effect opening of a container in said chamber in said operative position to permit discharge of said substance into the water flowing through the interior of said housing means.

4. A mixing device for forming liquid mixtures or solutions and comprising, in combination, housing means having an inlet and an outlet for water flowing through the interior of said housing means; holding means movably disposed within said interior and providing a fluid passage therearound, said holding means having an open chamber partly bounded by an abutment face and adapted to hold a closed container filled with a substance to be mixed with water, said holding means having a portion located outside of said housing means for manual operation and being mounted on said housing means movable between a loading position in which said open chamber is located outside of said housing means for insertion of a container and an operative position in which said chamber is located in said housing means, said holding means being fluid-tight mounted in said housing means in both said loading position and said operative position so that flowing water in said fluid passage is retained in said housing means in both positions; and manually operated container engaging means mounted on one of said means for movement toward and away from said abutment face for urging the container against said abutment face to effect opening of a container in said chamber in said operative position to permit discharge of said substance into the water flowing through the interior of said housing means.

5. A mixing device for forming liquid mixtures for solutions and comprising, in combination, housing means having an inlet and an outlet for water flowing through the interior of said housing means; tubular holding means movably disposed within said interior and providing a fluid passage therearound, said holding means being closed at one end thereof and having a chamber adapted to receive a container; manually operated container engaging means mounted on the other end of said tubular holding means closing the same, said container engaging means being coaxial with said tubular holding means, said container engaging means being mounted on said tubular holding means for movement toward and away from said chamber for opening a container in said chamber, and said holding means having a portion located outside of said housing means for manual operation being movable together with said container engaging means between a retracted position in which said chamber is located outside of said housing means for insertion of a container and an operative position in which said chamber is located in said housing means, said holding means being fluid-tight mounted in said housing means in both said loading position and said operative position so that flowing water in said fluid passage is retained in said housing means in both positions, movement of said container engaging means towards said chamber in said operative position of said holding means effecting opening of a container in said chamber to permit discharge of a substance contained in said container means into the water flowing through the interior of said housing means.

6. A device as set forth in claim 5 wherein said closed end of said tubular holding means projects from one side of said housing means and constitutes said portion for manual operation, and wherein said container engaging means projects from the opposite side of said housing means for manual operation; and including a cylindrical wall means turnably mounted in said housing means and fluid-tight surrounding said tubular holding means, said cylindrical wall having at least one opening located opposite said inlet means, and at least one other opening extending at an angle of 90° to said one opening, said openings communicating with said chamber.

7. A mixing device for forming liquid mixtures for solutions and comprising, in combination, housing means having an inlet and an outlet for water flowing through the interior of said housing means; tubular holding means movably disposed within said interior and providing a fluid passage therearound, said holding means being closed at one end thereof and having a chamber adapted to receive a container; manually operated container engaging means coaxial with said tubular holding, said container engaging means being mounted on said housing means for movement toward and away from said chamber for opening a container in said chamber, and said holding means having a portion located outside of said housing means for manual operation and being movable between a retracted position in which said chamber is located outside of said housing means for insertion of a container and an operative position in which said chamber is located in said housing means, said holding means being fluid-tight mounted in said housing means in both said loading position and said operative position so that flowing water in said fluid passage is retained in said housing means in both positions, movement of said container engaging means towards said chamber in said operative position of said holding means effecting opening of a container in said chamber to permit discharge of a substance contained in said container means into the water flowing through the interior of said housing means.

8. A device as set forth in claim 7 wherein said container engaging means projects from one side of said housing means for manual operation, and wherein said closed end of said holding means projects from the opposite side of said housing means and constitutes said portion for manual operation.

9. A device as set forth in claim 4 wherein said container engaging means has a blunt end face located opposite said abutment face so that the container is crushed between said surfaces when said container engaging means moves toward said chamber.

10. A device as set forth in claim 1 wherein said container engaging means includes a pointed end for piercing the wall of a container in said chamber.

11. A device as set forth in claim 10 wherein said pointed end of said container engaging means is formed with a passage adapted to communicate at one end with the pierced container, and having another end opening into said housing means so that the substance flows from the pierced container through said passage into said housing means.

12. A mixing device for forming liquid mixtures and solutions and comprising, in combination, tubular housing means having an inlet and an outlet for water flowing through the interior of said housing means and arranged coaxial with each other in the axis of said housing means; a tubular container holding means movably disposed within said interior and providing a fluid passage therearound, said holding means extending transverse to the axis of said housing means and having one end portion projecting on one side of said housing means for manual operation, and another end portion projecting from the other side of said housing means for manual operation, said container holding means having at the center thereof an open chamber adapted to hold a closed container filled with a substance to be mixed with water, said housing means including a sleeve having a first opening located opposite said inlet and a second opening located angularly displaced an angle of 90° to said first opening, said openings communicating with said chamber, said sleeve normally closing said chamber and slidably and fluid-tight supporting said tubular container holding means; a container engaging means mounted on said other end portion of said container holding means for movement between a retracted position and a container breaking position partly located in said chamber, said container engaging means having a free manually operable end portion projecting from said other end portion of said container holding means and from said housing means, said container holding means being manually movable in said sleeve together with said container engaging means between a retracted position in which said chamber is located outside of said housing means and said sleeve for insertion of a container, and an operative position in which said chamber is located between said inlet and said outlet within said sleeve, said holding means being fluid-tight mounted in said housing means in both said loading position and said operative position so that flowing water in said fluid passage is retained in said housing means in both positions.

13. A mixing device for forming liquid mixtures and solutions and comprising, in combination, tubular housing means having an inlet and an outlet for water flowing through the interior of said housing means and arranged coaxial with each other in the axis of said housing means; a tubular container holding means movably disposed within said interior and providing a fluid passage therearound, said holding means extending transverse to the axis of said housing and having one end portion projecting from one side of said housing means for manual operation, said container holding means having at the other end thereof a chamber having a first opening normally located opposite said inlet in an operative position of said holding means, and a second opening transverse to said first opening, said chamber being adapted to hold a closed container filled with a substance to be mixed with water and being fluid-tight mounted on said housing means for manual movement from an operative position to a retracted position in which said chamber is located outside of said housing means for insertion of a container, said holding means being fluid-tight mounted in said housing means in both said loading position and said operative position so that flowing water in said fluid passage is retained in said housing means in both positions; a container engaging means mounted on the other side of said housing means movable between a retracted position and an advanced position, said container engaging means having a manually operable portion located outside of said housing means and a pointed end portion located in said housing means opposite said second opening of said chamber so that movement of said container engaging means to said advanced position effects movement of said pointed end portion into said chamber whereby a container in said chamber is pierced.

References Cited in the file of this patent

UNITED STATES PATENTS

| | | |
|---|---|---|
| 564,615 | Handley | July 28, 1896 |
| 1,910,235 | Burkett | May 23, 1933 |
| 1,974,355 | Dellinger | Sept. 18, 1934 |
| 2,149,929 | Plastaras | Mar. 7, 1939 |
| 2,187,049 | Murphy | Jan. 16, 1940 |

FOREIGN PATENTS

| | | |
|---|---|---|
| 781 | Great Britain | Jan. 13, 1908 |